US012624818B2

(12) United States Patent
Zeng

(10) Patent No.: US 12,624,818 B2
(45) Date of Patent: May 12, 2026

(54) AIR BAG AND AIR BAG LAMP

(71) Applicant: YINGYOU EQUIPMENT CO., LTD., Shenzhen (CN)

(72) Inventor: Weiling Zeng, Shenzhen (CN)

(73) Assignee: YINGYOU EQUIPMENT CO., LTD., Shenzhen (CN)

(*) Notice: Subject to any disclaimer, the term of this patent is extended or adjusted under 35 U.S.C. 154(b) by 0 days.

(21) Appl. No.: 19/088,644

(22) Filed: Mar. 24, 2025

(65) Prior Publication Data

US 2025/0224093 A1 Jul. 10, 2025

Related U.S. Application Data

(63) Continuation of application No. PCT/CN2023/128374, filed on Oct. 31, 2023.

(30) Foreign Application Priority Data

Nov. 4, 2022 (CN) ......................... 202222950143.1

(51) Int. Cl.
*F21V 3/02* (2006.01)
*F21V 15/01* (2006.01)
(Continued)

(52) U.S. Cl.
CPC ............ *F21V 3/026* (2013.01); *F21V 15/012* (2013.01); *F21V 17/108* (2013.01); *F21W 2131/406* (2013.01)

(58) Field of Classification Search
CPC ...... F21V 3/026; F21V 15/012; F21V 17/108; F21W 2131/406
See application file for complete search history.

(56) References Cited

U.S. PATENT DOCUMENTS 6,612,711 B1 9/2003 Hagenbach et al.
11,920,775 B1 * 3/2024 Bruger ...................... F21S 9/02
(Continued)

FOREIGN PATENT DOCUMENTS

CN 210514896 5/2020
CN 211578293 9/2020
(Continued)

OTHER PUBLICATIONS

English Machine Translation of CN 210514896 provided by Espacenet (Year: 2019).*
(Continued)

*Primary Examiner* — Zheng Song
(74) *Attorney, Agent, or Firm* — Hodgson Russ LLP

(57) ABSTRACT

An air bag includes an outer cylinder and an inner cylinder provided inside the outer cylinder; the inner cylinder is transparent, a cavity is provided inside the inner cylinder, and a side surface of the outer cylinder is a soft light surface; an annular and enclosed inflation cavity is formed between the outer cylinder and the inner cylinder; the air bag is provided with an inflation opening in communication with the inflation cavity for inflating the air into the inflation cavity, to make the air bag expand; an installation opening is opened at an end of the air bag and corresponds to an end of the inner cylinder; and the installation opening is in communication with the cavity inside the inner cylinder for installment of the light source.

12 Claims, 5 Drawing Sheets

(51) Int. Cl.

| | |
|---|---|
| ***F21V 17/10*** | (2006.01) |
| *F21W 131/406* | (2006.01) |

(56) References Cited

U.S. PATENT DOCUMENTS

| | | | | |
|---|---|---|---|---|
| 2008/0051003 | A1* | 2/2008 | Hom | A63H 33/22 446/485 |
| 2008/0106888 | A1* | 5/2008 | Nalitchaev | E01F 9/617 362/96 |
| 2012/0020076 | A1 | 1/2012 | Leung | |
| 2012/0268913 | A1 | 10/2012 | Ng et al. | |
| 2018/0335197 | A1* | 11/2018 | Chen | F21V 3/026 |
| 2021/0011356 | A1 | 1/2021 | Ho et al. | |
| 2021/0176212 | A1* | 6/2021 | Han | H04L 63/0236 |
| 2024/0401769 | A1* | 12/2024 | Matuschek | F21V 17/10 |
| 2026/0022814 | A1* | 1/2026 | Zeng | F21V 3/026 |

FOREIGN PATENT DOCUMENTS

| | | | | |
|---|---|---|---|---|
| CN | 214122649 | | 9/2021 | |
| CN | 113566170 A | * | 10/2021 | F21V 3/026 |
| CN | 218481751 | | 2/2023 | |

OTHER PUBLICATIONS

English Machine Translation of CN 214122649 provided by Espacenet (Year: 2021).*

WIPO, International Search Report for PCT/CN2023/128374, Jan. 31, 2024.

EPO, Extended European Search Report for EP Application No. 23884922.8, Nov. 19, 2025.

* cited by examiner

AIR BAG AND AIR BAG LAMP

CROSS-REFERENCE TO RELATED APPLICATIONS

This application is a continuation of International Application No. PCT/CN2023/128374, filed on Oct. 31, 2023, and claims priority to Chinese Patent Application No. 202222950143.1, filed on Nov. 4, 2022, the entire disclosures of which are hereby incorporated herein by reference.

TECHNICAL FIELD

The present application relates to the technical field of a photographic equipment, and particularly to an air bag and an air bag lamp.

BACKGROUND

With the development of the information age, people's requirement for photography and videography is increasing. During the existing photography and videography processes, various soft light devices are often required. As a new type of soft light device, the air bag lamp is equipped with a airbag, such that the light emitted by the LED light source can to be scattered through the air in the airbag and the soft light cloth on the outer side of the airbag, with a better soft light effect, and it only needs to be inflated before use, and the operation is relatively convenient. Therefore, due to its good soft light performance, portability, simple operation and other characteristics, the air bag lamp in the market become more and more popular.

The light source of the existing air bag lamp is usually installed on portion of the side surface of the airbag. The light emitted by the light source is directed into the airbag, and then passes through the air in the airbag and is emitted from the side surface of the other portion of the airbag. As a result, the light cannot be emitted outward from the side surface of the air bag where the light source is installed, resulting in a smaller illuminated surface of the air bag lamp, which makes the air bag lamp impossible to emit light comprehensively, leading to a poor lighting effect and affecting the user experience.

SUMMARY

There are provided an air bag and an air bag lamp according to embodiments of the present application. The technical solution is as below:

According to a first aspect of embodiments of the present application, there is provided an air bag, which includes: an outer cylinder and an inner cylinder provided inside the outer cylinder;

- where the inner cylinder is transparent, a cavity is provided inside the inner cylinder, and a side surface of the outer cylinder is a soft light surface;
- an annular and enclosed inflation cavity is formed between the outer cylinder and the inner cylinder;
- where the air bag is provided with an inflation opening in communication with the inflation cavity for inflating the air into the inflation cavity, to make the air bag expand;
- an installation opening is opened at an end of the air bag and corresponds to an end of the inner cylinder; and
- the installation opening is in communication with the cavity inside the inner cylinder for installment of the light source, and the light emitted by the light source is capable of passing through the inflation cavity and the soft light surface in sequence and then emitted out of the air bag.

According to a second aspect of embodiments of the present application, there is provided an air bag lamp, including a light source and the air bag as mentioned above, where the light source is provided at the installation opening of the air bag.

DETAILED DESCRIPTION OF THE EMBODIMENTS

Embodiments embodying the features and advantages of the present application will be described in detail in the following description. It is to be understood that the present application is capable of various variations in different embodiments, none of which is outside the scope of the present application, and that the descriptions and drawings therein are intended to be illustrative in nature and are not intended to limit the present application.

In the description of the present application, it is to be understood that in the embodiments shown in the accompanying drawings, indications of orientation or positional relationships (such as up, down, left, right, forward and backward, etc.) are provided solely for the purpose of facilitating and simplifying the description of the present application, rather than indicating or implying that the device or element referred to must have a particular orientation, be constructed and operated in a particular orientation. These descriptions are appropriate when these elements are in the positions shown in the accompanying drawings. If the description of the position of these elements is changed, the indications of these orientations are changed accordingly.

Furthermore, the terms "first" and "second" are used only for descriptive purposes and are not to be understood as indicating or implying relative importance or implicitly specifying the number of technical features indicated. Thus, a feature defined with "first" and "second" may expressly or implicitly include one or more of the described features. In the description of the present application, "more than one" means two or more, unless otherwise expressly and specifically limited.

Figure 1:
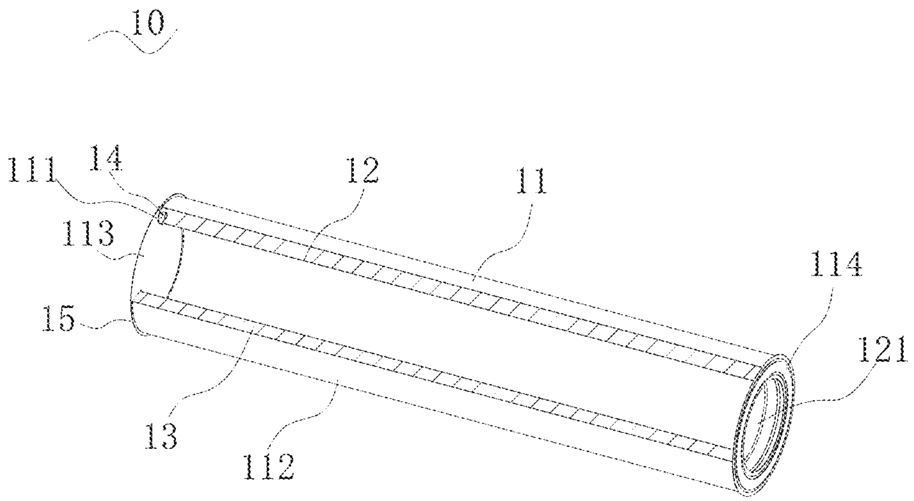
FIG. 1 is a structural schematic diagram of an embodiment of the air bag of the present application.

Referring to FIG. 1, an embodiment of the present application provides an air bag 10. The air bag 10 includes an outer cylinder 11 and an inner cylinder 12. The inner cylinder 12 is provided inside the outer cylinder 11, and the inner cylinder 12 is transparent. There is a cavity inside the inner cylinder 12, and the side surface of the outer cylinder 11 is a soft light surface. An annular and closed inflation cavity 13 is formed between the outer cylinder 11 and the inner cylinder 12. An inflation opening 111 in communication with the inflation cavity 13 is provided on the outer cylinder 11. The inflation opening 111 is used to inflate the air into the inflation cavity 13, to make the air bag 10 expanded.

An installation opening 121 is opened at an end of the air bag 10 and corresponds to the end of the inner cylinder 12. The installation opening 121 communicates with the cavity inside the inner cylinder 12. The installation opening 121 is used to install a light source 20. The light emitted by the light source 20 can pass through the inflation cavity 13 and the soft light surface in sequence and then be emitted out of the air bag 10.

In this embodiment, the outer cylinder 11 includes a main body portion 112, a first side cloth 113 and a second side cloth 114. The main body portion 112 is a soft light cloth, so that the light emitted by the light source 20 passing through the air bag 10 is softer. Each of the main body portion 112 and the inner cylinder 12 in this embodiment are cylindrical structures with openings at two ends and a hollow interior. The inner cylinder 12 is made of TPU, that is, thermoplastic polyurethane elastomer material, so that the inner cylinder 12 has excellent elasticity and flexibility.

In other examples of this embodiment, the main body portion 112 and the inner cylinder 12 can also be columnar structures of other shapes, such as square columnar structures, triangular columnar structures, polygonal columnar structures, etc., and will not be overly limited here. In addition, the main body portion 112 and the inner cylinder 12 can also be columnar structures of different shapes respectively. For example, the inner cylinder 12 is a cylindrical structure, and the main body portion 112 is a square columnar structure, so that the air bag 10 has different shapes and can be applied to different usage scenarios.

The first side cloth 113 in this embodiment is circular, and the first side cloth 113 closes an opening at an end of the main body portion 112. The inner cylinder 12 is provided inside the main body portion 112, and an end of the inner cylinder 12 is connected to the inner wall of the first side cloth 113. The second side cloth 114 is annular. The end of the main body portion 112 away from the first side cloth 113 is connected to the end of the inner cylinder 12 away from the first side cloth 113 through the second side cloth 114. The opening at the end of the inner cylinder 12 away from the first side cloth 113 constitutes the installation opening 121 of the air bag 10.

In this embodiment, the inflation opening 111 is provided on the first side cloth 113. The air bag 10 further includes an air nozzle 14, and the air nozzle 14 is provided at the inflation opening 111 to open or close the inflation opening 111. The air nozzle 14 in this embodiment is of a push type for the convenience of user operation. The air nozzle 14 can be ultrasonically attached to the first side cloth 113.

The inflation opening 111 can be opened through the air nozzle 14, and different gas can be filled into the inflation cavity 13 of the air bag 10 through the inflation opening 111 to meet the different light-emitting requirements of the air bag lamp 100 and expand the application range of the air bag lamp 100. After the air bag lamp 100 is used, the air in the inflation cavity 13 can be discharged through the inflation opening 111 to facilitate the storage of the air bag lamp 100.

In this embodiment, the air bag 10 further includes a diffuse reflection member (not shown in the figures.). The diffuse reflection member is provided on the inner side surface of the first side cloth 113, so that the portion of the inner side surface of the first side cloth 113 located inside the inner cylinder 12 forms a reflection surface. The light emitted by the light source 20 can be reflected by the reflection surface and then be emitted out of the air bag 10 through the inflation cavity 13.

The diffuse reflection member in this embodiment is optical silver-plated frosted particles. The optical silver-plated frosted particles are provided on the inner side surface of the first side cloth 113, so that the reflection surface formed by the first side cloth 113 has a high-efficiency reflection effect. In other examples, in addition to setting the optical silver-plated frosted particles on the inner side surface of the first side cloth 113, the inner side surface of the first side cloth 113 can also be frosted to form a frosted reflection surface, so as to have the functions of high reflection or diffuse reflection.

The installation opening 121 of the air bag 10 is configured for the placement of the light source 20, and the installation opening 121 is arranged opposite to the first side cloth 113. The light emitted by the light source 20 can directly hit the optical silver-plated frosted particles on the first side cloth 113, and then be reflected by the optical silver-plated frosted particles. The reflected light is uniformly diffused through the inner cylinder 12, the inflation cavity 13 and the main body portion 112 of the outer cylinder 11.

The light source 20 is provided at the installation opening 121, and the light source 20 is provided opposite to the first side cloth 113. Part of the light emitted by the light source 20 is directed onto the diffuse reflection member. After the light is diffusely reflected on the reflection surface formed on the inner side surface of the first side cloth 113, it enters the inflation cavity 13 from different positions, and then passes through the soft light surface of the outer cylinder 11 and is emitted out to achieve a soft light effect.

In addition, the air bag 10 further includes a connection Velcro 15. The connection Velcro 15 is provided on the outer surface of the first side cloth 113. The connection Velcro 15 can be connected to other components, so that the air bag 10 and the air bag lamp 100 can be adaptively installed on different functional components. Or, a plurality of air bags 10 can be spliced through the connection Velcro 15 to be suitable for various usage environments.

Figure 2:
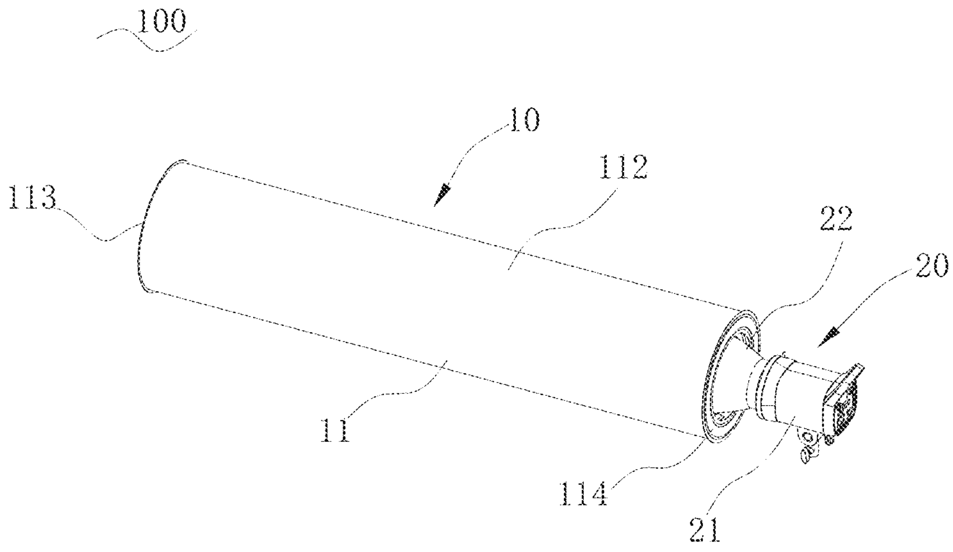
FIG. 2 is a structural schematic diagram of an embodiment of the air bag lamp of the present application.
Figure 3:
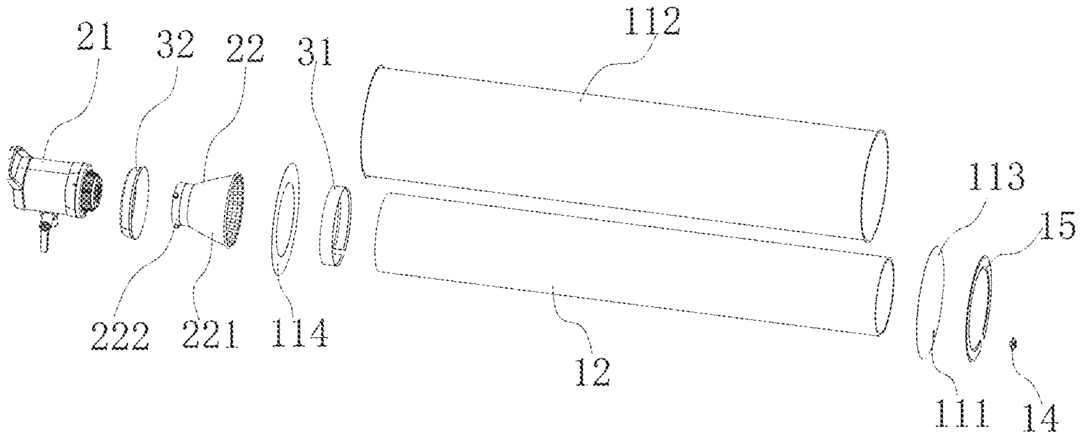
FIG. 3 is an exploded view of the air bag lamp shown in FIG. 2.
Figure 4:
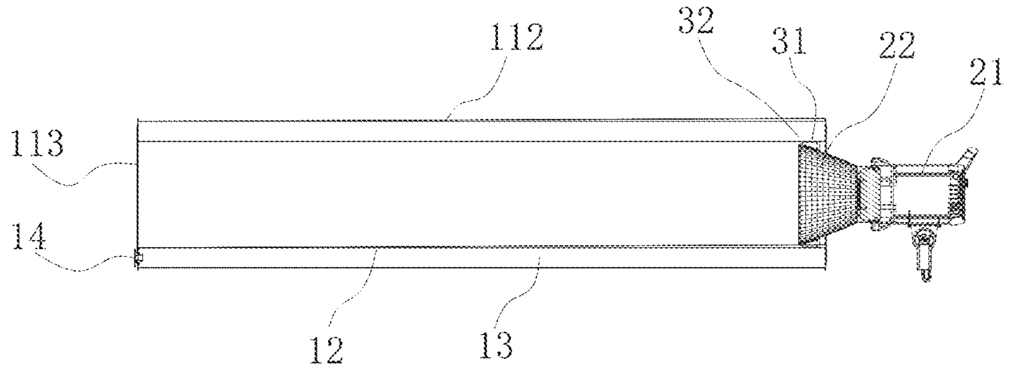
FIG. 4 is a cross-sectional view of the air bag lamp shown in FIG. 2.

Referring to FIGS. 2 to 4, an embodiment of the present application provides an air bag lamp 100. The air bag lamp 100 includes a light source 20 and the above-mentioned air bag 10, and the light source 20 is provided at the installation opening 121 of the air bag 10.

In this embodiment, the light source 20 includes a lamp 21 and a reflector 22, and the lamp 21 is used to emit light. The reflector 22 includes a cover main body 221 and a connection portion 222. The cover main body 221 is in a horn shape with openings at two ends and a hollow interior. The two ends of the cover main body 221 are a large opening end and a small opening end respectively.

The connection portion 222 is provided at the small opening end of the cover main body 221. The connection portion 222 can be a buckle or a hook. The lamp 21 is clamped and fixed to the cover main body 221 through the connection portion 222. The large opening end of the cover main body 221 is connected to the installation opening 121, and the light emitted by the lamp 21 enters the inner cylinder 12 through the cover main body 221. A small amount of the light emitted by the lamp 21 can be emitted out of the air bag 10 through the inflation cavity 13 and the main body portion 112, and a large amount of the light is directly directed onto the inner side surface of the first side cloth 113. After being reflected by the reflection surface formed by the first side cloth 113, it is emitted to the outside through the inflation cavity 13 and the main body portion 112, making the light emitted by the light source 20 more uniform and soft.

In this embodiment, the air bag lamp 100 further includes an inner cavity Velcro 31 and a cover body Velcro 32. The cover body Velcro 32 is in a circular ring shape and is annularly provided on the periphery of the cover main body 221. The inner cavity Velcro 31 is provided on the inner wall of the inner cylinder 12 and close to the installation opening 121. The cover body Velcro 32 is adhered to the inner cavity Velcro 31, so that the reflector 22 is fixed at the installation opening 121 of the air bag 10.

When manufacturing the air bag lamp 100 in this embodiment, the air bag 10 is first manufactured. Specifically, the connection Velcro 15 is ultrasonically attached and fixed to the outer side surface of the first side cloth 113, and the air nozzle 14 is ultrasonically fixed to the first side cloth 113. The inner cavity Velcro 31 is ultrasonically attached to the inner side surface of the transparent TPU for manufacturing the inner cylinder 12, and the inner cavity Velcro 31 is provided close to an end of the TPU. Then, the soft light cloth for manufacturing the main body portion 112 of the outer cylinder 11 and the TPU fixed with the inner cavity Velcro 31 are ultrasonically attached to form the main body portion 112 and the inner cylinder 12 of the cylindrical structure. The main body portion 112 is sleeved outside the inner cylinder 12, and the first side cloth 113 and the second side cloth 114 are ultrasonically attached to the two ends of the main body portion 112 and the inner cylinder 12 respectively to obtain the air bag 10.

After the air bag 10 is manufactured, the cover body Velcro 32 is pasted on the surface of the reflector 22, and the reflector 22 together with the cover body Velcro 32 is placed in the inner cylinder 12, and the cover body Velcro 32 is adhered and fixed to the inner cavity Velcro 31, so that the reflector 22 is fixed at the installation opening 121 of the air bag 10, and a portion of the large opening end of the reflector 22 extends into the inner cylinder 12. Then, the inflation cavity 13 is inflated through the inflation opening 111 to expand the air bag 10, so that the cover body Velcro 32 and the cavity Velcro are more closely adhered. Then, the lamp 21 is clamped and fixed to the connection portion 222 of the reflector 22, and the lamp 21 is powered on, thus the assembly of the air bag lamp 100 is completed.

The main body portion of the reflector 22 in this embodiment is located outside the air bag 10 and will not shield the inner side wall of the inner cylinder 12, so that the light emitted by the light source 20 can completely pass through the inner cylinder 12, so that the surface of the air bag lamp 100 forms a complete light-emitting surface, ensuring the light-emitting area of the air bag lamp 100 and improving the lighting effect of the air bag lamp 100. A portion of the large opening end of the reflector 22 extends into the inner cylinder 12 to avoid light leakage of the air bag lamp 100 and ensure its lighting advantage.

Figure 5:
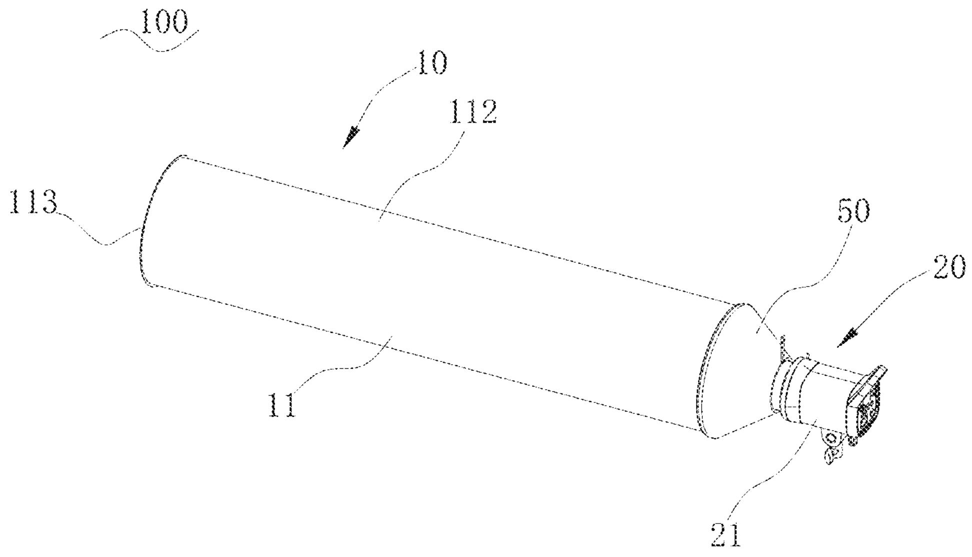
FIG. 5 is a structural schematic diagram of another embodiment of the air bag lamp of the present application.
Figure 6:
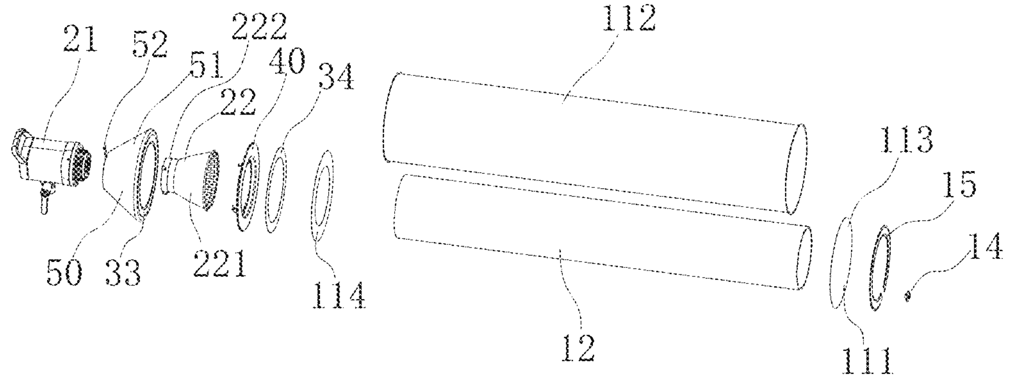
FIG. 6 is an exploded view of the air bag lamp shown in FIG. 5.
Figure 7:
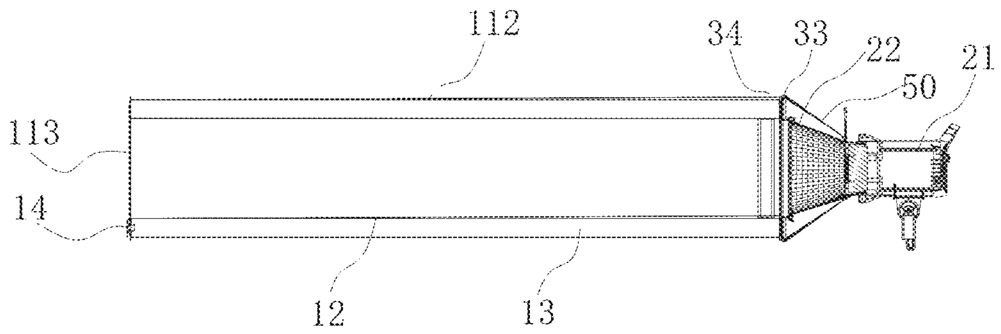
FIG. 7 is a cross-sectional view of the air bag lamp shown in FIG. 5.

Referring to FIGS. 5 to 7, in another example of this embodiment, the air bag lamp 100 further includes a bracket 40, and the bracket 40 is annular. The bracket 40 is provided on a periphery of the large opening end of the cover main body 221, and the bracket 40 can be clamped and fixed to the cover main body 221.

The air bag lamp 100 in this example further includes a horn-shaped storage bag 50, a bag opening Velcro 33 and a port Velcro 34. The storage bag 50 includes a bag body 51 and a drawstring 52. The bag body 51 is generally in a horn shape, and the opened storage bag 50 can be tightened through the drawstring 52. The bag opening Velcro 33 is provided on the periphery of the end opening of the storage bag 50.

The port Velcro 34 is provided on the periphery of the installation opening 121 of the air bag 10, that is, on the outer surface of the second side cloth 114. The bag opening Velcro 33 is adhered to the port Velcro 34. The reflector 22 is inside the storage bag 50, and the end surface of the bracket 40 abuts against the outer surface of the second side cloth 114.

When manufacturing the air bag lamp 100 in this example, the air bag 10 is first manufactured. Specifically, the connection Velcro 15 is ultrasonically attached and fixed to the outer side surface of the first side cloth 113, the air nozzle 14 is ultrasonically fixed to the first side cloth 113, and the port Velcro 34 is ultrasonically attached and fixed to the outer surface of the second side cloth 114. Then, the soft light cloth for manufacturing the main body portion 112 of the outer cylinder 11 and the TPU fixed with the inner cavity Velcro 31 are ultrasonically attached to form the main body portion 112 and the inner cylinder 12 of the cylindrical structure. The main body portion 112 is sleeved outside the inner cylinder 12, and the first side cloth 113 and the second side cloth 114 are ultrasonically attached to the two ends of the main body portion 112 and the inner cylinder 12 respectively to form the air bag 10.

After the air bag 10 is manufactured, the bag opening Velcro 33 is adhered to the port Velcro 34, so that the storage bag 50 is fixed to the air bag 10. The inflation cavity 13 is inflated through the inflation opening 111 to expand the air bag 10, the bracket 40 is clamped and fixed to the reflector 22, then the storage bag 50 is opened and the reflector 22 is placed in the storage bag 50, and the drawstring 52 is tightened to tighten the storage bag 50 and the bracket 40 is made to abut against the outer side surface of the second side cloth 114. The reflector 22 is connected to the lamp 21, and the lamp 21 is powered on, thus the assembly of the air bag lamp 100 is completed.

In the air bag lamp 100 of this example, the reflector 22 is located outside the air bag 10 and will not shield the inner side wall of the inner cylinder 12, so that the light emitted by the light source 20 can completely pass through the inner cylinder 12, so that the surface of the air bag lamp 100 forms a complete light-emitting surface, ensuring the light-emitting area of the air bag lamp 100 and improving the lighting effect of the air bag lamp 100. The storage bag 50 can form a wrap around the outer periphery of the reflector 22 to avoid light leakage of the air bag lamp 100 and ensure its lighting advantage.

Figure 8:
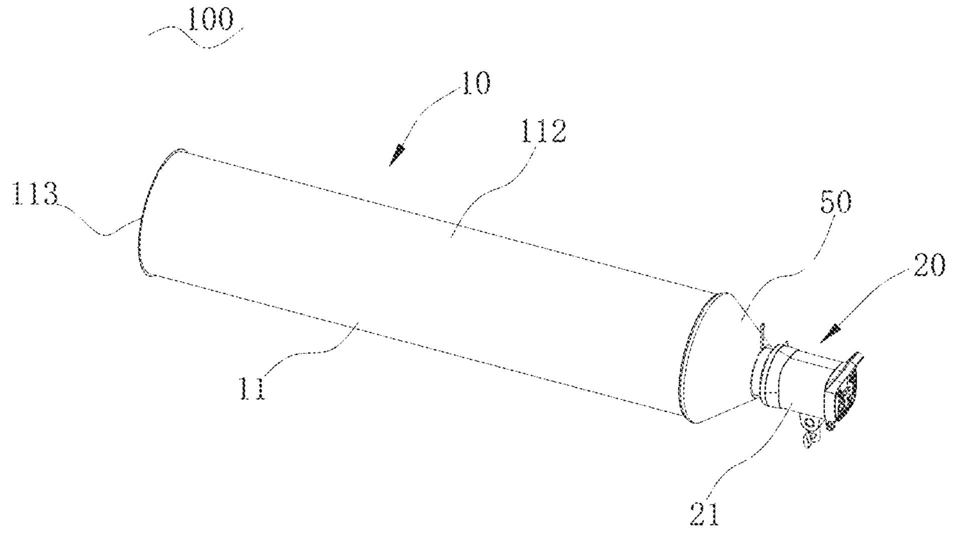
FIG. 8 is a structural schematic diagram of yet another embodiment of the air bag lamp of the present application.
Figure 9:
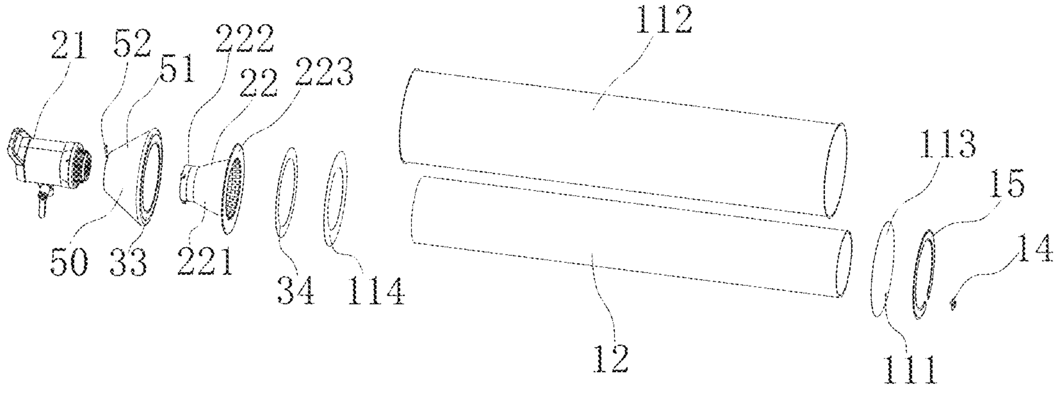
FIG. 9 is an exploded view of the air bag lamp shown in FIG. 8.
Figure 10:
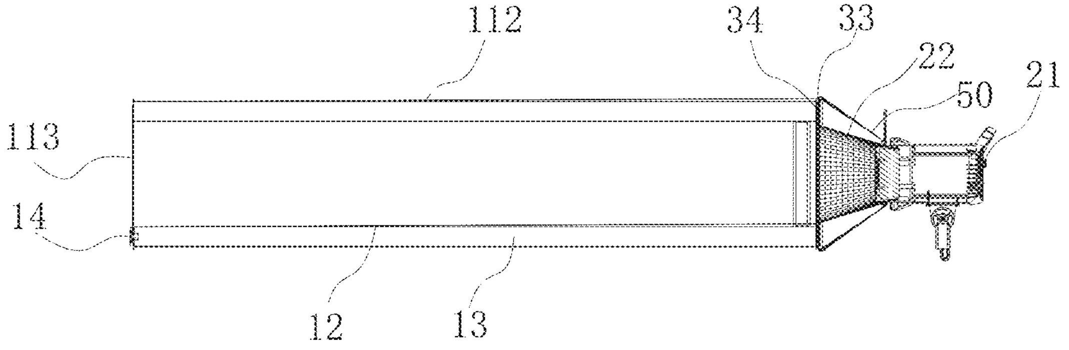
FIG. 10 is a cross-sectional view of the air bag lamp shown in FIG. 8.

Referring to FIGS. 8 to 10, in yet another example of this embodiment, the reflector 22 further includes a transition portion 223. The transition portion 223 is annular and is provided on the periphery of the large opening end of the cover main body 221. The air bag lamp 100 in this example further includes a horn-shaped storage bag 50, a bag opening Velcro 33 and a port Velcro 34.

The storage bag 50 includes a bag body 51 and a drawstring 52. The bag body 51 is generally in a horn shape, and the opened storage bag 50 can be tightened through the drawstring 52. The bag opening Velcro 33 is provided on the periphery of the end opening of the storage bag 50. The port Velcro 34 is provided on the periphery of the installation opening 121 of the air bag 10, that is, on the outer side surface of the second side cloth 114. The bag opening Velcro 33 is adhered to the port Velcro 34, so that the storage bag 50 is fixed to the air bag 10. The reflector 22 is provided in the storage bag 50, and the transition portion 223 of the reflector 22 abuts against the outer side surface of the second side cloth 114 of the air bag 10.

When manufacturing the air bag lamp 100 in this example, the air bag 10 is first manufactured. Specifically, the connection Velcro 15 is ultrasonically attached and fixed to the outer side surface of the first side cloth 113, the air nozzle 14 is ultrasonically fixed to the first side cloth 113, and the port Velcro 34 is ultrasonically attached and fixed to the outer surface of the second side cloth 114. Then, the soft light cloth for manufacturing the main body portion 112 of the outer cylinder 11 and the TPU fixed with the inner cavity Velcro 31 are ultrasonically attached to form the main body portion 112 and the inner cylinder 12 of the cylindrical structure. The main body portion 112 is sleeved outside the inner cylinder 12, and the first side cloth 113 and the second side cloth 114 are ultrasonically attached to the two ends of the main body portion 112 and the inner cylinder 12 respectively to form the air bag 10.

After the air bag 10 is manufactured, the bag opening Velcro 33 is adhered to the port Velcro 34, so that the storage bag 50 is fixed to the air bag 10. The inflation cavity 13 is inflated through the inflation opening 111 to expand the air bag 10, then the storage bag 50 is opened and the reflector 22 is placed in the storage bag 50, and the drawstring 52 is tightened to tighten the storage bag 50, and the transition portion 223 of the reflector 22 is made to abut against the second side cloth 114. The reflector 22 is connected to the lamp 21, and the lamp 21 is powered on, thus the assembly of the air bag lamp 100 is completed.

In the air bag lamp 100 of this example, the reflector 22 is located outside the air bag 10 and will not shield the inner side wall of the inner cylinder 12, so that the light emitted by the light source 20 can completely pass through the inner cylinder 12, so that the surface of the air bag lamp 100 forms a complete light-emitting surface, ensuring the light-emitting area of the air bag lamp 100 and improving the lighting effect of the air bag lamp 100. The storage bag 50 can form a wrap around the outer periphery of the reflector 22 to avoid light leakage of the air bag lamp 100 and ensure its lighting advantage.

For the air bag and the air bag lamp of the present application, an installation opening for installment of the light source is formed at an end of the air bag, and an annular inflation cavity is formed inside the air bag. The light source in the air bag lamp is arranged at the installation opening, and the light emitted by the light source can enter the inflation cavity of the air bag and be emitted out from the soft light surface of the outer cylinder. Since the light source is arranged at the installation opening on the end face of the air bag, it does not shield the side surface of the air bag, so that the light emitted by the light source can completely pass through the annular inflation cavity, to make the entire side surface of the air bag lamp become a light-emitting surface, such that the light-emitting area of the air bag lamp is increased, the lighting effect of the air bag lamp is effectively improved, to ensure the user experience.

While the present application is described with reference to several exemplary embodiments, it should be understood that the terms used are illustrative and exemplary, not limiting. Since the invention can be practiced in a variety of forms without departing from the spirit or substance of the present application, it should be understood that the foregoing embodiments are not limited to any of the foregoing details but should be construed broadly within the spirit and scope of the accompanying claims, and therefore all variations and adaptations falling within the scope of the claims, or their equivalents, should be covered by the accompanying claims.

What is claimed is:

1. An air bag lamp, comprising a light source and an air bag, wherein the light source is provided at an installation opening of the air bag;

wherein the air bag comprises an outer cylinder and an inner cylinder provided inside the outer cylinder;

wherein the inner cylinder is transparent, a cavity is provided inside the inner cylinder, and a side surface of the outer cylinder is a soft light surface;

an annular and enclosed inflation cavity is formed between the outer cylinder and the inner cylinder;

wherein the air bag is provided with an inflation opening in communication with the inflation cavity for inflating the air into the inflation cavity, to make the air bag expand;

the installation opening is opened at an end of the air bag and corresponds to an end of the inner cylinder;

the installation opening is in communication with the cavity inside the inner cylinder for installment of the light source, and the light emitted by the light source is capable of passing through the inflation cavity and the soft light surface in sequence and then emitted out of the air bag;

wherein the light source comprises a lamp and a reflector;

wherein the air bag lamp further comprises a cover body Velcro, wherein the cover body Velcro is connected to a cover main body of the reflector; and wherein the air bag lamp further comprises an inner cavity Velcro, wherein the inner cavity Velcro is provided on an inner wall of the inner cylinder and close to the installation opening, and the cover body Velcro is adhered to the inner cavity Velcro, to make the reflector fixed at the installation opening of the air bag.

2. The air bag lamp according to claim 1, wherein the outer cylinder comprises a main body portion, a first side cloth and a second side cloth;

wherein each of the main body portion and the inner cylinder is a cylindrical structure with openings at two ends and a hollow interior; and wherein the first side cloth closes the opening at an end of the main body portion, and an end of the inner cylinder is connected to an inner wall of the first side cloth.

3. The air bag lamp according to claim 2, wherein the second side cloth is annular;

wherein an end of the main body portion away from the first side cloth is connected to an end of the inner cylinder away from the first side cloth through the second side cloth; and wherein the opening at the end of the inner cylinder away from the first side cloth constitutes the installation opening.

4. The air bag lamp according to claim 3, wherein an inner side surface of the first side cloth is a frosted surface to form a reflection surface; and wherein the light emitted by the light source is reflected by the reflection surface and then emitted out of the air bag through the inflation cavity.

5. The air bag lamp according to claim 3, further comprising a connection Velcro, wherein the connection Velcro is provided on an outer side surface of the first side cloth.

6. The air bag lamp according to claim 3, wherein the inflation opening is provided on the first side cloth, and the air bag further comprises an air nozzle, and the air nozzle is provided at the inflation opening to open or close the inflation opening.

7. The air bag lamp according to claim 1, wherein the reflector comprises the cover main body and a connection portion;

the cover main body is of a horn shape with openings at two ends and a hollow interior;

one of the two ends of the cover main body is a large opening end and another end of the two ends of the cover main body is a small opening end;

the connection portion is provided at the small opening end of the cover main body;

the lamp is connected to the cover main body through the connection portion; and the large opening end of the cover main body is connected at the installation opening, and the light emitted by the lamp enters into the inner cylinder through the cover main body.

8. The air bag lamp according to claim 7, further comprising a bracket, wherein the bracket is annular and provided on a periphery of the large opening end of the cover main body.

9. The air bag lamp according to claim 8, further comprising a horn shaped storage bag, a bag opening Velcro and a port Velcro;

wherein the bag opening Velcro is provided on a periphery of an opening of the storage bag, and the port Velcro is provided on a periphery of the installation opening of the air bag;

the bag opening Velcro is adhered to the port Velcro; and the reflector is provided inside the storage bag, and an end surface of the bracket is abutted against the periphery of the installation opening of the air bag.

10. The air bag lamp according to claim 7, wherein the reflector further comprises a transition portion, and the transition portion is provided on a periphery of the large opening end of the cover main body.

11. The air bag lamp according to claim 10, further comprising a horn shaped storage bag, a bag opening Velcro and a port Velcro;

wherein the bag opening Velcro is provided on a periphery of an opening of the storage bag, and the port Velcro is provided on a periphery of the installation opening of the air bag;

the bag opening Velcro is adhered to the port Velcro; and the reflector is provided in the storage bag, and the transition portion is abutted against the periphery of the installation opening of the air bag.

12. The air bag lamp according to claim 7, wherein the cover body Velcro is annularly provided on a periphery of the cover main body.

* * * * *